(12) United States Patent
Le Bail

(10) Patent No.: US 7,815,732 B2
(45) Date of Patent: Oct. 19, 2010

(54) CONTINUOUS METHOD FOR PARTIALLY CRYSTALLISING A SOLUTION AND A DEVICE FOR CARRYING OUT SAID METHOD

(75) Inventor: Alain Michel Daniel Le Bail, Nantes (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 1046 days.

(21) Appl. No.: 10/585,371

(22) PCT Filed: Jan. 5, 2005

(86) PCT No.: PCT/FR2005/000011

§ 371 (c)(1),
(2), (4) Date: Aug. 23, 2006

(87) PCT Pub. No.: WO2005/068040

PCT Pub. Date: Jul. 28, 2005

(65) Prior Publication Data

US 2009/0028764 A1    Jan. 29, 2009

(30) Foreign Application Priority Data

Jan. 6, 2004    (FR) .................................. 04 00044

(51) Int. Cl.
*C30B 7/08* (2006.01)

(52) U.S. Cl. ...................... 117/11; 117/206; 422/245.1; 422/251; 23/293 R; 62/354; 62/544

(58) Field of Classification Search ................ 23/295 R; 62/354, 544; 117/11, 206; 422/245.1, 251
See application file for complete search history.

(56) References Cited

U.S. PATENT DOCUMENTS

| 4,334,783 | A | 6/1982 | Suzaka | |
|---|---|---|---|---|
| 6,305,189 | B1 * | 10/2001 | Menin | ........................ 62/544 |
| 6,383,456 | B1 * | 5/2002 | Hartel et al. | ............. 422/245.1 |
| 2004/0116741 | A1 * | 6/2004 | Nordhoff et al. | ............ 562/600 |
| 2005/0049426 | A1 * | 3/2005 | Windhab et al. | ............ 554/211 |
| 2009/0124811 | A1 * | 5/2009 | Coquerel et al. | ......... 546/273.7 |

FOREIGN PATENT DOCUMENTS

| DE | 101 11 679 A | 9/2002 |
|---|---|---|
| EP | 0 765 605 A | 4/1997 |
| WO | WO 92/07120 A | 4/1992 |
| WO | WO 00/72695 A | 12/2000 |
| WO | WO 02/13618 A | 2/2002 |

* cited by examiner

*Primary Examiner*—Robert M Kunemund
(74) *Attorney, Agent, or Firm*—Foley & Lardner LLP

(57) ABSTRACT

The invention relates to a device for the partial crystallization of a phase in a solution, comprising at least one pump for circulation of the solution in a circuit of a heat exchanger formed from at least one tube in contact with a cooling circuit, characterized in that the circuit of the exchanger includes static means to mix the solution, so that the crystallized particles of the phase are continuously mixed with the solution during the circulation of said solution. The invention also relates to an assembly including several devices according to the invention or several parts of such a device. The invention also relates to a method to use such a device.

22 Claims, 2 Drawing Sheets

Figure 1:
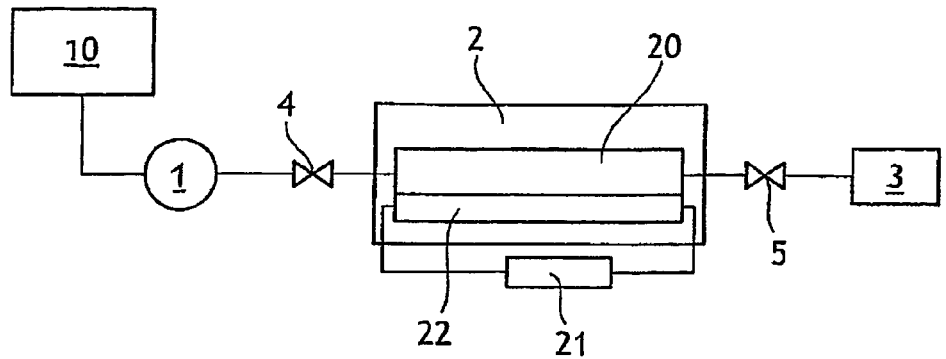

CONTINUOUS METHOD FOR PARTIALLY CRYSTALLISING A SOLUTION AND A DEVICE FOR CARRYING OUT SAID METHOD

This application is a National Stage application of PCT/FR2005/000011, filed Jan. 5, 2005, which claims priority from French patent application FR 0400044, filed Jan. 6, 2004. The entire contents of each of the aforementioned applications are incorporated herein by reference.

GENERAL AREA OF THE INVENTION

The invention concerns a method and a device for partially crystallising a solution in a continuous stream or a semi-continuous stream such as a fluctuating stream for example.

STATE OF THE ART

In certain applications, it is desired to be able to partially crystallise a dissolved phase of a solution in circulation in a device.

The freezing of a solution is achieved by lowering its temperature. The start-of-freezing temperature is the temperature at which the first ice crystals are able to appear.

However, in practice it is necessary to lower the temperature below the start-of-freezing temperature in order to bring about the start of crystallisation. This phenomenon is called supercooling. The phenomenon of the appearance of the first crystals is called "supercooling rupture" and the difference between the start-of-freezing temperature and the temperature at which crystallisation will start is called the "supercooling amplitude".

The appearance of the first crystals is called "nucleation" and is an exothermic phenomenon that gives off heat. The temperature of the mixture composed of the solution and the ice crystals will therefore rise to a temperature slightly below the start-of-freezing temperature during supercooling rupture. By continuing to cool the mixture, we encourage the growth of the crystals formed during supercooling rupture, and also trigger the appearance of new crystals. This last phenomenon is called secondary crystallisation.

The mass concentration of ice crystals related to the unit of mass of the solution is called the ice grade.

The partial freezing or partial crystallisation of a solution therefore aims, starting from a solution of zero ice density grade and whose temperature is in principle equal to or greater than the start-of-freezing temperature, to obtain a solution that has an ice grade greater than 0% and less than the maximum grade. The maximum grade is defined as the ice grade obtained at a temperature very much below the start-of-freezing temperature (40° C. below the start-of-freezing temperature for example).

A continuous system includes a heat exchanger in which partial crystallisation takes place by cooling of the phase during the circulation of the solution.

The phase to be crystallised is generally a salt or a solvent in any solution, aqueous or not.

In the case of an aqueous solution, the objective is to form a partially frozen liquid containing fine particles of ice, so that the fluid can always flow in the device under the action of a pump.

Here we give two possible examples of applications in which a partial crystallisation is desired.

A first application example concerns a binary ice or ice slurry, and is used as the cold-bearing fluid in a heat-exchange device. We define "ice slurry" as a mixture with a ratio of about 10 to 70% of ice by weight.

Such binary ices or such ice slurries are generally solutions of water and alcohol and/or of salts and/or of sugars, such as sodium chloride, calcium chloride, potassium chloride, sucrose, etc., for example. The cold-bearing mixtures can also be any fluid capable of storing the cold energy in the form of latent heat by water-ice solidification.

A second application example concerns edible ice creams. For these applications, it concerns partially freezing a preparation containing mainly water and/or milk, fats and/or pieces of fruit, and inserting fine bubbles of air into it. The volume of air to be introduced is more or less equal to the volume of the preparation in the case of an edible ice cream.

Several types of device of previous design allow the implementation of partial crystallisation.

A first type of device is called a "direct-contact generator". In this type of device, we put the fluid to be crystallised directly in contact with a chilled surface.

A second type of device is called a "vacuum generator". In this type of device, we keep the fluid to be partially crystallised close to its triple point. The devices of previous design have certain drawbacks however.

The direct-contact generators work by means of mechanical scraping of the crystallised particles on the walls of the exchanger. They therefore have a power that is limited by the power of the mechanical scraping device. They are thus more expensive and complex, due to the presence of rotating parts and mechanisms.

The vacuum generators are very complex, very expensive and very bulky. They are consequently ill suited to the targeted applications, especially in the food area. In fact they are designed for a particular type and volume of production and they are not modular and so not flexible.

PRESENTATION OF THE INVENTION

The invention has as its objective to overcome at least one of the aforementioned drawbacks.

One of the objectives of the invention is to propose a simple technique for the partial crystallisation of a phase in any solution, aqueous or not.

Thus, one of the objectives of the invention is to propose a fairly inexpensive technique for the partial crystallisation of a phase in any solution, aqueous or not.

In particular, one of the objectives of the invention is to propose a device for partial crystallisation using no moving or rotating parts or mechanisms. Another objective of the invention is to propose a device for partial crystallisation which does not maintain the phase to be partially crystallised close to its triple point.

Another objective of the invention is to propose a device for the partial crystallisation of a phase which is modular and of significant unitary power.

Another objective of the invention is to propose a device for the partial crystallisation of a phase which, by virtue of its modularity, can be placed in parallel in order to adapt to several types and volumes of production, in particular in the food area.

To this end, the invention proposes a device for the partial crystallisation of a phase in a solution, comprising at least one pump for circulation of the solution in a circuit of a heat exchanger formed from at least one tube in contact with a cooling circuit, characterised in that the circuit of the exchanger includes one or more means used to control the supercooling amplitude, and means capable of triggering the crystallisation (supercooling rupture) at a precise site located inside the exchanger or in a zone between a first exchanger and a second exchanger in a large exchanger assembly for example.

The crystallisation device also advantageously includes static devices for mixing the solution so that the particles crystallised during the supercooling rupture phenomenon of the flowing solution are continuously mixed with the solution during the circulation of the said solution.

The devices designed to trigger the crystallisation, and the static mixing devices, can comprise elements forming obstacles positioned within the flow (needle, plate, etc.). They can also be changes of direction of circulation of the flow and/or a change of lining of the internal walls of each tube.

The supercooling maintenance, rupture or mixing means can be a combination of the different materials comprising the exchanger or materials positioned in contact with the solution inside the exchanger. The material (as well as its surface state which may be specific) located upstream of the point of rupture in the exchanger, favours the supercooling phenomenon, while the material (as well as its surface state which may be specific) located downstream favours supercooling rupture. Thus, a hydrophobic plastic with a very smooth surface state (low roughness) will tend to delay supercooling rupture and will allow the temperature to be reduced below the start-of-freezing temperature without crystallisation, while a metal with a rough surface state will tend in principle to favour supercooling rupture (triggering of the crystallisation).

The section of the tube can also be variable after the supercooling rupture zone, so that during the phase of growth of the crystals formed during supercooling or during the secondary nucleation phase occurring after supercooling rupture, the flow of the solution whose viscosity will increase markedly and whose apparent density will reduce (volumic expansion due to crystallisation of the water) can flow without the need for excessive upstream pressure.

The fluid is made to circulate at a constant rate or at a fluctuating rate, meaning that the flow phases are followed by phases during which the fluid is immobile or at a lower speed. These fluctuations can be of the on/off type (instantaneous passage from a zero or low speed to a nominal speed) or of the sinusoidal type or indeed of the sawtooth type. It is therefore also possible to circulate the fluid in a succession of flow phases at variable speeds.

The invention also advantageously has the following characteristics, either alone or in any of their technically possible combinations:

the change of direction is an elbow in the circulation circuit, and/or a chicane, and/or at least one change of section inside the circulation circuit;

the circuit of the exchanger includes at least one valve used to regulate the flow of the solution;

the valve is controlled manually, or is controlled by an independent system of the thermostat type using one or more parameters or the difference between two or more parameters. These parameters can be the input temperature of the solution to be crystallised or a temperature (temperature of the solution, temperature of the tube in the exchanger, temperature of the primary fluid used to cool the exchanger) located at any point situated upstream of the supercooling rupture zone, the output temperature of the solution to be crystallised, or a temperature (temperature of the solution, temperature of the tube in the exchanger, temperature of the primary fluid used to cool the exchanger) at any point located between the supercooling rupture zone and the output of the exchanger, the temperature of the solution at the moment of supercooling rupture, or the flow of the upstream feed, particularly in the case where several devices (exchangers) are fed by the same pump.

the circulation circuit includes means for introducing gas bubbles into the solution;

the means for introducing the gas are placed in the circulation of the solution or at the walls of a tube.

The invention also concerns an assembly composed of a multiplicity of devices according to the invention or a multiplicity of parts of such a device.

The invention also concerns a method for using such a device.

PRESENTATION OF THE FIGURES

Figure 2:
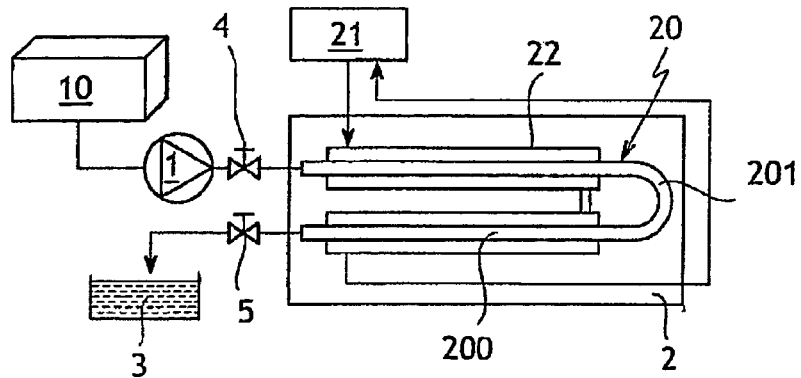
Figure 3:
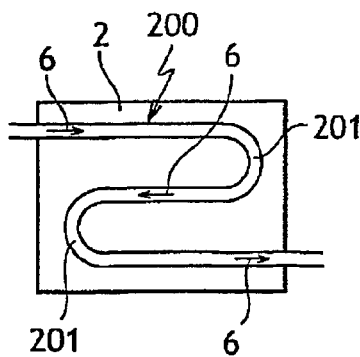
Figure 4:
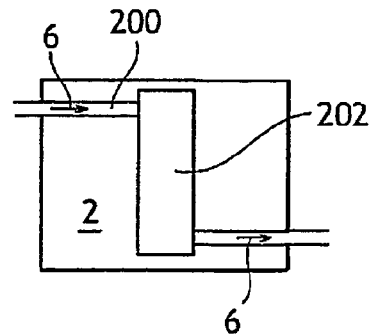
Figure 5:
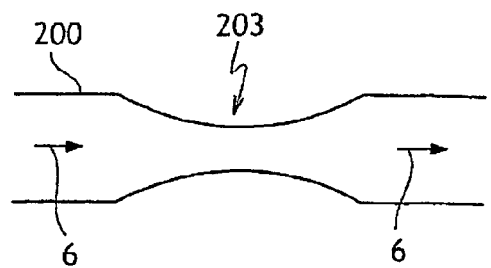
Figure 6:
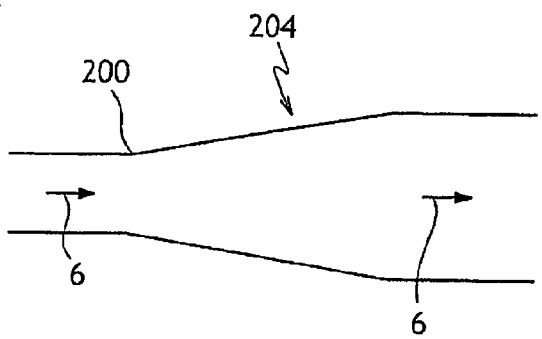
Figure 7:
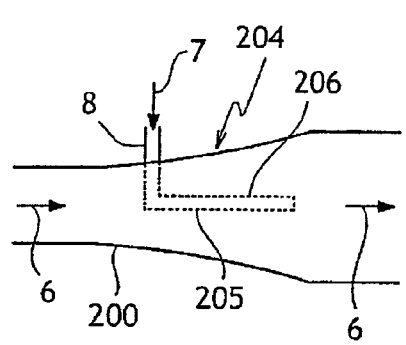
Figure 8:
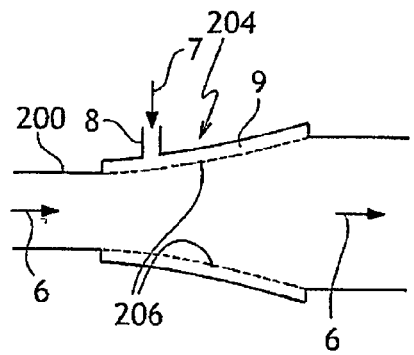
Figure 9:
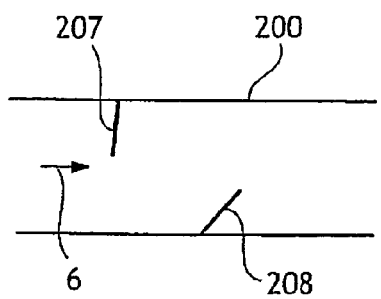

Other characteristics, objectives and advantages of the invention will emerge from the description that follows, which is purely illustrative and not limiting in any way, and which should be read with reference to the appended figured in which:

FIG. 1 diagrammatically represents a possible method of implementation of a device according to the invention;

FIG. 2 diagrammatically represents a method of implementation of a device according to the invention in which on a mixing device has been shown more precisely;

FIGS. 3 to 5 diagrammatically represent several possible methods of implementation of mixing devices;

FIG. 6 diagrammatically represents a longitudinal section of a pipe in a circulation circuit of a device according to the invention; and FIGS. 7 and 8 diagrammatically represent methods for the implementation of device for introducing a gas into the circulation circuit, and FIG. 9 diagrammatically represents methods for the implementation of mixing devices inside a tube.

In all of the figures, similar elements carry identical numerical references.

DETAILED DESCRIPTION

As shown diagrammatically in FIGS. 1 and 2, a possible device according to the invention essentially includes at least one pump 1 used to circulate a solution in a heat exchanger, referenced by the number 2, and connected at the input to a tank 10 of the solution and at the output to receptacle 3 for the partially crystallised solution.

Each pump 1 is already familiar to the professional engineer. However, the control for the pump, which may or may not be of the measuring type, will allow variation of the fluid flow during the method as a function of one or more regulation systems associated with sensors judiciously positioned in the device.

The fluid is made to circulate at a constant rate or at a fluctuating rate, meaning that the flow phases are followed by phases during which the fluid is immobilised or moves at a lower speed. These fluctuations can be of the on/off type (instantaneous passage from zero or low speed to a nominal speed) or of the sinusoidal type or indeed of the sawtooth type. It is therefore also possible to circulate the fluid in a succession of flow phases at variable speeds.

A valve 4 is placed between the pump 1 and the input of the exchanger 2, while a valve 5 is placed at the output of the exchanger 2 before receptacle 3. The valve 5 performs homogeneous mixing of the solution at the output of the exchanger 2 and enables its flow to be adjusted.

Each valve can be controlled manually or by an independent system of the thermostat type using one or more of the following parameters or the difference between two or more parameters. The parameters can be:

the input temperature of the solution to be crystallised, or a temperature (temperature of the solution, temperature of the tube of the exchanger, temperature of the primary fluid used to cool the exchanger) located at any point upstream of the supercooling rupture zone;

the output temperature of the solution to be crystallised, or a temperature (temperature of the solution, temperature of the tube of the exchanger, temperature of the primary fluid used to cool the exchanger) at any point located between the supercooling rupture zone and the output of the exchanger, and/or the temperature of the solution at the moment of supercooling rupture or the flow of the upstream feed, in particular in the case where several devices (exchangers) are fed by the same pump.

The heat exchanger 2 mainly comprises a circuit for the circulation 20 of the solution, in contact with a cooling circuit 22. Thus the pump 1 circulates the solution in the circuit 20 of the exchanger 2. The length of the circuit is typically of the order of a few meters (from 1 to 5 meters approximately).

An external chilling unit 21 is used to circulate a refrigerated fluid at a negative temperature in the cooling circuit 22.

By means of the chilling unit 21 and the cooling circuit 22 for the refrigerated fluid, the outer wall of the solution circulation circuit 20 is held at a negative temperature, for example of the order of –5° to –30° Celsius. This negative temperature allows effective refrigeration of the solution contained in the device.

The chilling unit 21 can comprise a system by direct expansion of a refrigerant fluid or any other refrigeration device known to the professional engineer.

The refrigerant fluid circulating in the circuit 22 can be a cryogenic fluid such as liquid nitrogen for example, or a refrigerant fluid used in a mechanical compression appliance.

Note again that the solution can be a cold-bearing liquid for example, or an edible ice cream.

In any event, the solution has to be introduced into the exchanger 2 at a temperature as close as possible to the opening freezing temperature.

As shown more precisely in FIG. 2, the circulation circuit 20 is mainly composed of tubes 200. The solution circulates inside the tubes 200, while the cryogenic or refrigerant fluid used to cool the solution circulates outside the tubes 200 in the circuit 22.

Preferably, the tubes 200 forming the circuit 20 have a small internal diameter, of the order of 5 to 30 mm for example. Each tube 200 is in a plastic material or in metal or in glass.

The exchanger 2 includes a zone composed of static means to maintain the supercooling in order to delay the appearance of crystals, and a zone composed of static supercooling rupture means to allow the appearance of crystals.

The supercooling maintenance means are used in particular to control the supercooling amplitude. They are placed upstream 5 of the rupture means of course.

To this end, each tube 200 can advantageously comprise a material or is covered by a membrane on its internal surface to form a coating that takes the form of a material and/or a surface state designed to delay the appearance of crystals. The membrane can cover all or part of the internal surface of each tube. The membrane can be formed from a hydrophobic plastic membrane, or glass or a special paint. The surface state can advantageously have a low roughness.

The supercooling rupture means include at least one change of lining of the internal walls of each tube in relation to the maintenance means, and/or at least one change of direction of the circulation of the solution, and/or at least one obstacle to the circulation of the solution on the internal walls of each tube.

FIG. 3 shows that the change of direction of the circulation of the solution can take the form of and elbow 201 in the tubes. Each elbow 201 does not necessarily execute a 180-degree turn in the circulation 6 of the solution, but can simply impose a change of direction on the circulation circuit 20. In general, a change of direction can mean any device in the circulation circuit 20 such as the generator of the internal surface of a portion of rectilinear tube located upstream over a minimum length of 10 times the diameter of the tube forming a rupture angle of more than about 5 degrees in relation to a portion of tube downstream.

FIG. 4 shows that the change of direction can also take the form of a chicane 202. The rupture angle is thus equal to 90 degrees in this case.

FIG. 5 shows that the change of direction can also be a change of section 203 of the tube 200 in the circulation circuit 20.

The change of section 203 is preferably a shrinkage of the section. The shrinkage 203 is preferably local, with the section of the tube upstream and downstream of the shrinkage 203 being more or less the same. The shrinkage takes place over a length which is more or less equal to 3 times the diameter of the tube 200 before the shrinkage.

FIG. 9 shows that the obstacles 207 and 208 positioned within the tube 200 can form the supercooling rupture means. The obstacles can take the form of plates for example, or of fins 207 or 208 lying perpendicularly to the inner wall of the tube 200 or obliquely. The obstacles 207 or 208 can have many different shapes. They can also take the form of needles for example. The obstacles 207 and 208 are attached or made from the material of the walls of the tube 200.

The change of lining of the internal walls takes the form of a change of material and/or a change of the surface state, designed to interrupt the supercooling and allow the appearance of crystals. The material of the rupture means is preferably a metal. The change of surface state at the rupture means takes the form of greater roughness.

The mixing devices can include at least one non-stick coating on at least one part of the internal walls of each tube 200, and/or at least one change of direction of the circulation of the solution, and/or at least one obstacle 207, 208 to the circulation of the solution on the internal walls of each tube.

The non-stick coating can take the form of a membrane on the internal surface of the tubes. The membrane can cover all or part of the internal surface of each tube. The objective of the membrane is to limit sticking of the particles of ice formed during the crystallisation onto the walls of the tubes 200.

FIG. 2 shows an example of the presence of the static mixing devices—here referenced by 201—in the circuit 20 of the exchanger 2 used to continuously mix the crystallised particles at the wall inside the circuit 20 to all of the solution at or after the point of rupture.

FIG. 2 shows only a single mixing device. Of course, the exchanger can include several mixing devices placed along the circuit 20.

During the heat exchanges, the crystallised particles are at the inner wall of the tubes 200 and form a crown.

The mixing devices are used to unstick the crown of crystallised particles and thus to allow mixing of these particles at the central part of the solution in circulation.

Several methods of implementation of mixing devices are possible.

FIG. 3 shows that the mixing devices of the circuit 20 can take the form of an elbow 201 in the tubes. Each elbow 201 does not necessarily execute a 180-degree turn in the circulation 6 of the solution, but can simply impose a change of direction on the circulation circuit 20.

In general, a "mixing device" refers to any device in the circulation circuit 20, such as the generator of the internal surface of a portion of rectilinear tube located upstream over a minimum length of 10 times the diameter of the tube forming a rupture angle of more than about 5 degrees in relation to a portion of tube downstream.

FIG. 4 shows that the mixing devices can also take the form of a chicane 202. The rupture angle is thus equal to 90 degrees in this case.

FIG. 5 shows that the mixing devices can also be a change of section 203 of the tube 200 in the circulation circuit 20. The change of section 203 is preferably a shrinkage of the section. The shrinkage 203 is preferably local, with the section of the tube upstream and downstream of the shrinkage 203 being more or less the same. The shrinkage takes place over a length that is more or less equal to 3 times the diameter of the tube 200 before the shrinkage.

FIG. 9 shows that the mixing devices can also be obstacles 207 and 208 positioned within the tube 200. The obstacles can take the form of plates for example, or of fins 207 or 208 lying perpendicularly to the inner wall of the tube 200 or obliquely. The obstacles 207 or 208 can have many different shapes. They can also take the form of needles for example.

The obstacles 207 and 208 are attached or made from the material of the walls of the tube 200.

The obstacles 207 and 208 constitute mixing devices. Note again that they can also constitute the device used to control the crystallisation triggering zone. This is the case in particular of needles.

FIG. 6 shows that the internal diameter of the circulation circuit 20 is not necessarily constant throughout the circulation circuit.

The density of the solution reduces in parallel with the crystallisation, in particular because ice has a specific volume which is greater than that of water for example.

Thus, it is judicious to increase the section of the tube 200 of the circuit 20 at the moment of freezing of the phase in the solution, in order to facilitate its circulation.

Moreover, a change to the section of passage of the tubes 200 constituting the circuit leads to a change in the speed of circulation and in the pressure of the solution.

The change to the speed of circulation influences the contact time between the solution and the cooled internal surface of the tubes 200. It is possible therefore to act upon this parameter in order to control the speed of crystallisation of the solution.

Furthermore, a change in the pressure of the solution also results in a greater degree of crystallisation, as described in the reminder of this present description.

Note again that during the circulation of the solution in the exchanger 2, crystallisation takes place mainly by heat exchange at the walls between circuit 20 and circuit 22.

Advantageously however, and as shown in FIGS. 7 and 8, it is possible to introduce gas into the solution in the form of micro-bubbles.

The expansion of the micro-bubbles of air or nitrogen introduced into the solution produces a refrigeration effect which also contributes to the crystallisation of the phase of the solution.

A change in the pressure of the solution therefore results in an expansion of the micro-bubbles of gas in the solution.

This gas is preferably dinotrogen ($N_2$), or air in the case of edible ice creams. We therefore get the formation of an emulsion or of a foam in the circuit 20.

As shown in FIGS. 7 and 8, the gas is introduced into the circulation circuit 20 by means of nozzles 205 and 206.

FIG. 7 shows a first method of implementation of a nozzle 205 according to which a conduit 8 is introduced into the circulation 6 of the solution through the wall of the tube 200 more or less perpendicularly to the circulation 6. The conduit 8 is elbowed in the direction of the circulation and so that the extremity of the conduit 8 is more or less parallel to the circulation 6, over a length equal to 2 or 3 times the diameter of the tube 200 upstream of the conduit 8 for example. Microperforations 206 at the extremity of the conduit 8 allow the release of the micro-bubbles of gas in a homogeneous manner into the solution 6.

A widening 204 of the section of the tube 200 is advantageously executed opposite to the extremity of the conduit, so that the expansion of the gas in the solution is facilitated, because of the change to the speed of circulation of the solution and to its pressure.

FIG. 8 shows a second method of implementation of a nozzle 206 according to which a conduit 8 is used to introduce the gas into a balance chamber 9 set on the outer wall of the tube 200 of the circuit 20.

The chamber 9 extends approximately over a length which is more or less equal to 3 to 5 times the diameter of the tube 200, the diameter being that upstream of the conduit 8.

Microperforations 206 between the chamber 9 and the wall of the tube 200 allow the release of the micro-bubbles of gas in a homogeneous manner into the solution 6.

A widening 204 of the section of the tube 200 is advantageously executed opposite to the extremity of the conduit, so that the expansion of the gas in the solution is facilitated by means of the change to the speed of circulation of the solution and to its pressure.

In both cases, the gas is introduced under pressure into the solution.

The gas can also be introduced into the solution before the latter enters into the exchanger 2, and before or after the circulation pump 1. This then results in the freezing of the emulsion already containing the micro-bubbles of gas.

Naturally several tubes 200 can be placed in parallel in order to increase the rate of flow by weight in the device, or in order to create ice creams of different flavours for example.

Thus, the device can be modular, and can include several exchangers according to the invention, with one or more circulation pumps, the power then being adapted by the number of tubes.

It is thus possible envisage a construction in the conventional radiator form of the exchanger according to the invention, with a direct expansion on the exterior of the tubes.

Tests have shown that one possible device according to the invention can have a flow of about 90 g/minute of ice slurry exiting with an ice grade of between 30% and 50% for an initial water-alcohol solution of 10% by weight. The output temperature of the ice slurry is approximately −5 to −10° C.

In the device on which the tests were conducted, the internal diameter of the tube is equal to 8 mm and the length of the tube is equal to 4 meters. This develops a power per tube of about 270 W.

The power is therefore high, and the device quite inexpensive, since it is of simple design. In fact it has no moving mixing device.

The device is therefore advantageously, though not limitatively, used in the food area for the production of ice creams, and in the area of refrigerant fluid production, in particular for the production of air-conditioning devices.

The invention claimed is:

1. A device for the partial crystallisation of a phase in a solution, comprising at least one pump for circulation of the solution in a circuit of a heat exchanger formed from at least one tube in contact with a cooling circuit, wherein the circuit of the exchanger includes
   a zone comprising static means to maintain supercooling in order to delay the appearance of crystals, the supercooling maintenance means including a non-stick coating on at least one part of the internal walls of each tube, where the coating takes the form of a material and/or of a surface state designed to delay the appearance of crystals, and
   a zone comprising static supercooling rupture means to allow the appearance of crystals, the supercooling rupture means include
      at least one change of coating of the internal walls of each tube,
      and/or at least one change of direction of the circulation of the solution,
      and/or at least one obstacle to the circulation of the solution on the internal walls of each tube,
the change of coating of the internal walls taking the form of a change of material and/or of a change of the surface state, designed to interrupt the supercooling and allow the appearance of crystals.

2. A device according to claim 1, also comprising a zone comprising static devices for mixing the solution so that the crystallised particles of the phase are continuously mixed with the solution during the circulation of the said solution.

3. A device according to claim 1, in which the material is a hydrophobic plastic or glass.

4. A device according to claim 1, in which the surface state has a low roughness.

5. A device according to claim 1, in which the material of the supercooling rupture means is a metal.

6. A device according to claim 1, in which the change of surface state at the supercooling rupture means takes the form of greater roughness.

7. A device according to claim 1, in which the mixing devices include at least one non-stick coating on at least one part of the internal walls of each tube, and/or at least one change of direction of the circulation of the solution, and/or at least one obstacle to the circulation of the solution on the internal walls of each tube.

8. A device according to claim 1, in which the change of direction is an elbow in the circulation circuit, and/or a chicane, and/or at least one change of section inside the circulation circuit.

9. A device according to claim 1, in which the obstacles to the circulation of the solution include needles and/or plates.

10. A device according to claim 1, in which the section inside the circuit progressively increases.

11. A device according to claim 1, in which the circulation circuit includes means for introducing bubbles of gas into the solution.

12. A device according to claim 11, in which the means for introducing the gas are placed in the circulation of the solution or at the walls of a tube.

13. An assembly, including a multiplicity of devices according to claim 1.

14. A method for the partial crystallisation of a phase in a solution, comprising a step that consists in circulating the solution in a circuit of a heat exchanger formed from at least one tube using at least one pump, including a step that consists of:
   holding the temperature below the start-of-freezing temperature in order to delay the appearance of crystals with static supercooling maintenance means, the supercooling maintenance means including a non-stick coating on at least one part of the internal walls of each tube, where the coating takes the form of a material and/or of a surface state designed to delay the appearance of crystal; and
   bringing about supercooling rupture with static supercooling rupture means to trigger the appearance of the crystallisation, the supercooling rupture means including at least one change of coating of the internal walls of each tube, and/or at least one change of direction of the circulation of the solution, and/or at least one obstacle to the circulation of the solution on the internal walls of each tube, the change of coating of the internal walls taking the form of a change of material and/or of a change of the surface state, designed to interrupt the supercooling and allow the appearance of crystals.

15. A method according to claim 14, comprising a step consisting of continuously mixing the crystallised particles of the phase with the solution during the circulation of the said solution by means of static solution mixing devices.

16. A method according to claim 15, comprising a step consisting of varying the flow of the solution over time, by acting on a valve or on the pump.

17. A method according to claim 14, comprising a step consisting of varying the flow of the solution by means of a valve in the circulation circuit.

18. A method according to claim 14, comprising a step consisting of introducing bubbles of gas into the solution circulation circuit.

19. A device according to claim 3, in which the surface state has a low roughness.

20. A device according to claim 5, in which the change of surface state at the supercooling rupture means takes the form of greater roughness.

21. A device according to claim 7, in which the change of direction is an elbow in the circulation circuit, and/or a chicane, and/or at least one change of section inside the circulation circuit.

22. A device according to claim 7, in which the obstacles to the circulation of the solution include needles and/or plates.

* * * * *